United States Patent
Murray et al.

(10) Patent No.: US 9,556,938 B2
(45) Date of Patent: Jan. 31, 2017

(54) BELT DRIVE HAVING A SPEED SELECTION SHIFT MECHANISM

(71) Applicant: CNH America LLC, New Holland, PA (US)

(72) Inventors: Craig Elwyn Murray, Davenport, IA (US); Nicholas Laufenberg, Glen Ellyn, IL (US); Scott Hogan, Bettendorf, IA (US); Orlin Wayne Johnson, Geneseo, IL (US)

(73) Assignee: CNH Industrial America LLC, New Holland, PA (US)

( * ) Notice: Subject to any disclaimer, the term of this patent is extended or adjusted under 35 U.S.C. 154(b) by 574 days.

(21) Appl. No.: 13/687,780

(22) Filed: Nov. 28, 2012

(65) Prior Publication Data

US 2014/0148286 A1    May 29, 2014

(51) Int. Cl.
  *F16H 9/04* (2006.01)
  *A01D 69/08* (2006.01)
  *F16D 21/04* (2006.01)

(52) U.S. Cl.
  CPC ............. *F16H 9/04* (2013.01); *A01D 69/08* (2013.01); *F16D 21/04* (2013.01)

(58) Field of Classification Search
  CPC .. F16H 9/04; F16H 2007/0806; Y10T 4/1946; A01D 69/08
  USPC .......................................................... 474/76
  See application file for complete search history.

(56) References Cited

U.S. PATENT DOCUMENTS

| | | | | |
|---|---|---|---|---|
| 443,938 | A | * | 12/1890 | Fleming ................... 280/238 |
| 546,703 | A | * | 9/1895 | Lippy et al. ................ 474/76 |
| 1,704,433 | A | | 3/1929 | Harris |
| 2,474,789 | A | * | 6/1949 | Perhacs ..................... 192/48.9 |
| 3,017,977 | A | * | 1/1962 | Settimi et al. ............ 192/48.8 |
| 3,869,030 | A | * | 3/1975 | Masaki ..................... 192/69.61 |
| 3,918,311 | A | * | 11/1975 | Maier ........................... 74/37 |
| 4,479,402 | A | | 10/1984 | Reichel |
| 4,798,271 | A | * | 1/1989 | Gattermann et al. ....... 192/18 R |
| 5,871,412 | A | | 2/1999 | Moser |
| 6,773,367 | B2 | * | 8/2004 | Laufenberg et al. .......... 474/58 |
| 6,929,574 | B2 | * | 8/2005 | Laufenberg et al. .......... 474/70 |
| 7,591,254 | B2 | * | 9/2009 | Machner ................... 123/559.1 |
| 7,758,462 | B2 | | 7/2010 | Veldman |
| 8,491,274 | B2 | * | 7/2013 | Taylor et al. ................ 417/223 |

(Continued)

FOREIGN PATENT DOCUMENTS

| CN | 2793447 Y | 7/2006 |
|---|---|---|
| DE | 3546342 A1 | 7/1987 |

(Continued)

*Primary Examiner* — William A Rivera
(74) *Attorney, Agent, or Firm* — Patrick Sheldrake; Peter Zacharias

(57) ABSTRACT

A speed select shift mechanism for a belt drive assembly to be installed on a shaft capable of shifting between high, low and neutral speeds is disclosed. The shift mechanism includes a shift collar that is enclosed within an enclosure to prevent debris from contacting the inner operations of the shift mechanism and thereby reduce wear and tear of the shift mechanism along with down time for maintenance of the device. The shift mechanism includes a shaft, a first pulley, a shift collar, a second pulley and a shifter. The shift collar further includes dowels that cooperatively engage corresponding apertures on the pulleys.

20 Claims, 13 Drawing Sheets

(56) References Cited

U.S. PATENT DOCUMENTS

2004/0009834 A1    1/2004    Laufenberg
2007/0095333 A1*    5/2007    Jones .......................... 123/559.1
2013/0210506 A1*    8/2013    Hollatz ........................ 460/112

FOREIGN PATENT DOCUMENTS

JP    54112446    9/1979
WO    2011144993    11/2011

\* cited by examiner

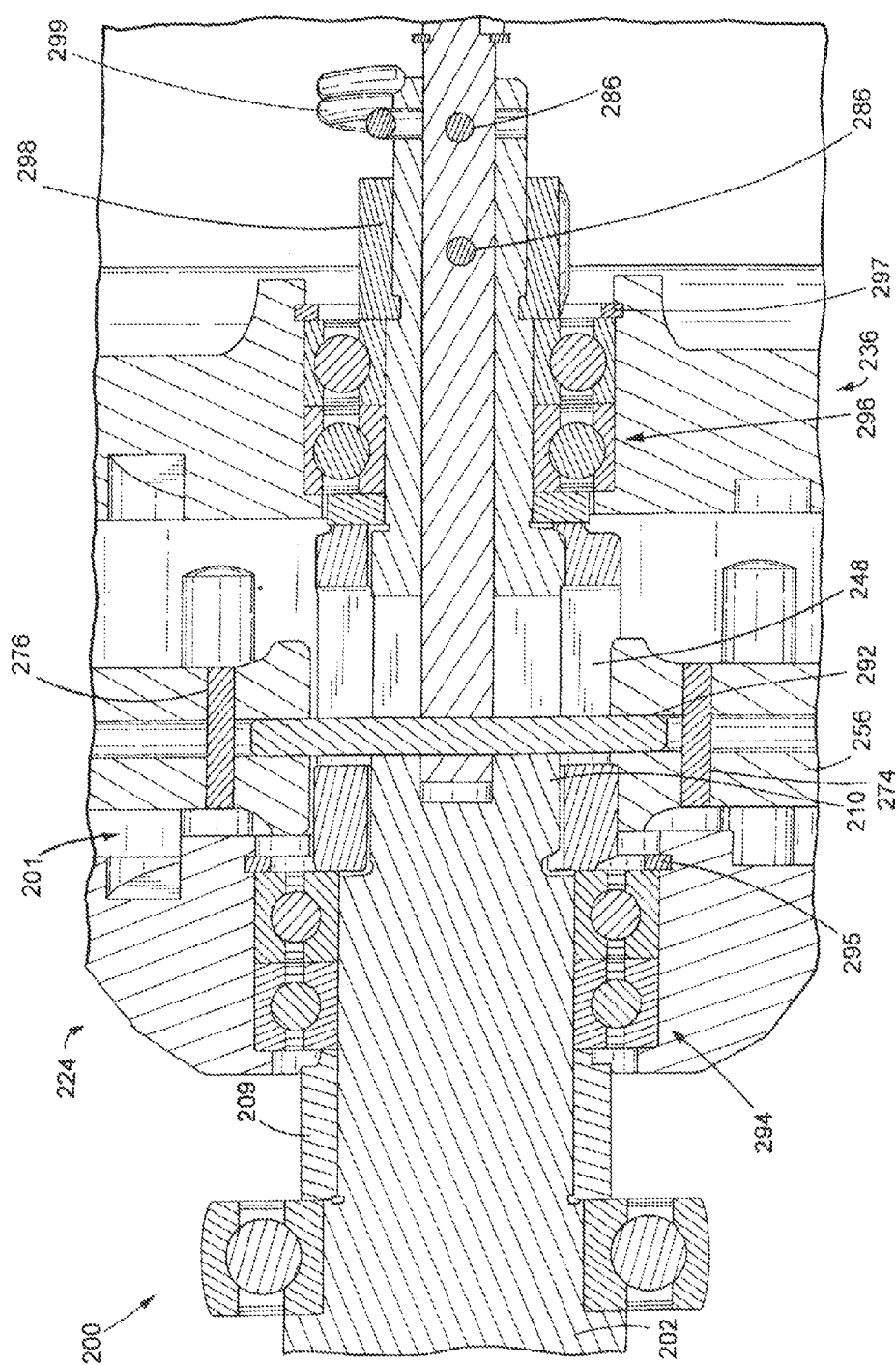

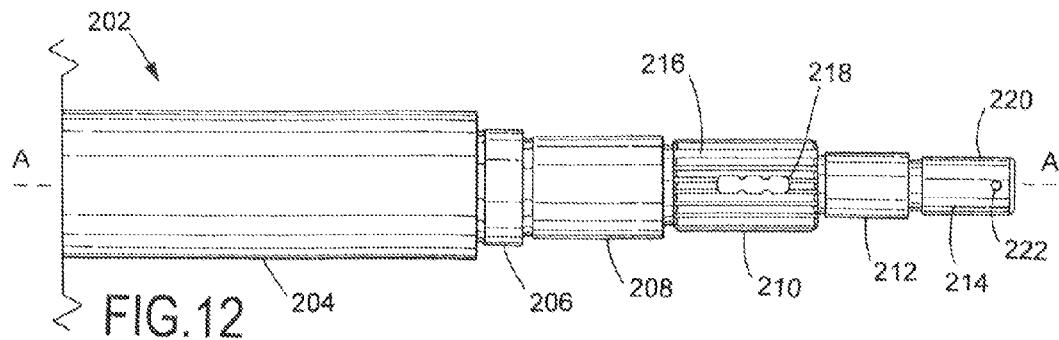
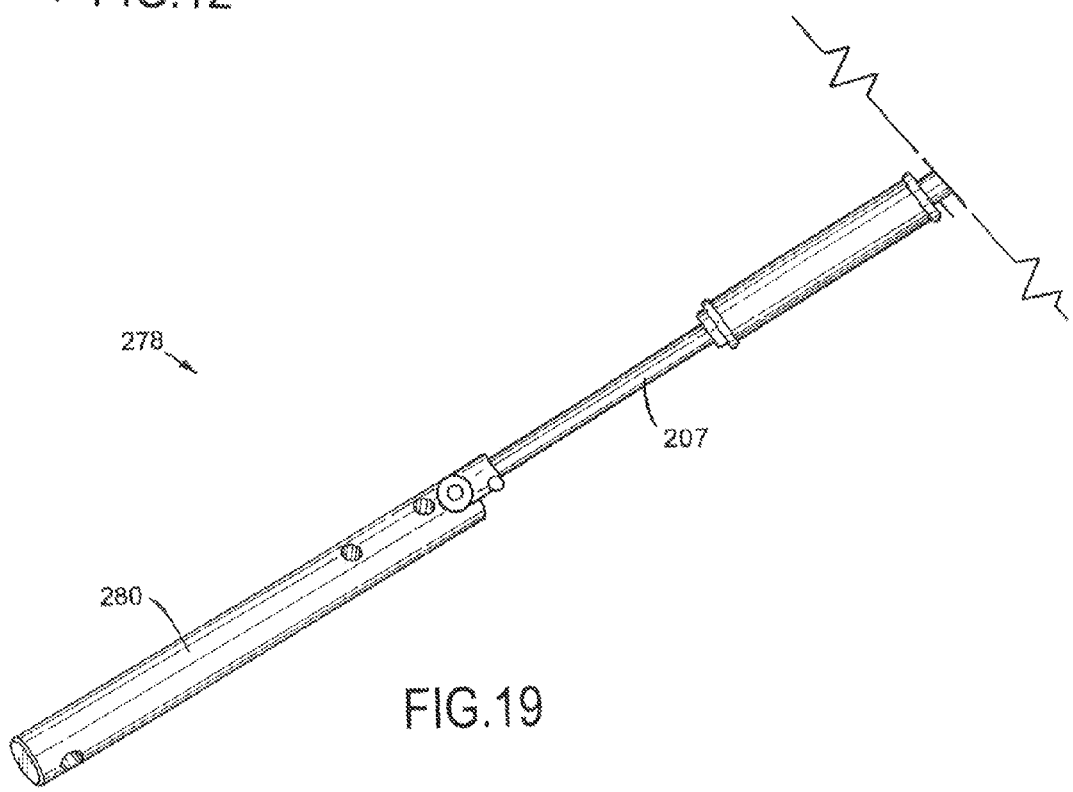
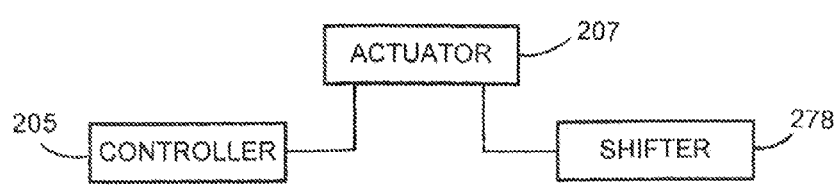

US 9,556,938 B2

BELT DRIVE HAVING A SPEED SELECTION SHIFT MECHANISM

BACKGROUND OF THE INVENTION

The present invention relates generally to a belt drive having a speed selection shift mechanism. In particular, the present invention relates to a shift collar that is moveable and engageable between a pair of drive pulleys.

To shift between speeds on conventional belt drive mechanisms, such as those used on agricultural combines, involves stopping the rotation of the belt drive, removing tension on the belt and moving the belt from one set of pulleys to another. Typically, to accomplish this, a tensioning mechanism for the pulley belt or belts must be disengaged or released. The belt or belts must then be moved from one set of pulleys to a second set of pulleys. Then, the belt tension mechanism must be re-engaged. Belt tension on such belt drive mechanisms is relatively high and thus a mechanical advantage device, such as a relatively long lever arm, is utilized to engage and disengage the tensioning mechanism. Moreover, moving the belt or belts can be difficult due to the length of the belts and/or the location of the belts within the framework of e.g., an agricultural combine.

Thus, what is sought is a belt drive shift mechanism for rotatable items on agricultural machines, such as combines and the like, which eliminates the need for engaging and disengaging the belt tensioning mechanism, and physically moving the belt or belts from one set of pulleys to another. However, conventional belt drive shift mechanisms have a number of drawbacks. For example, due to the arrangement, complexity and shape of conventional shifter mechanisms, such devices are very expensive, difficult to manufacture and easily susceptible to mechanical malfunction as a result of harvesting debris interfering with the mechanical operation of the shifter mechanism.

Thus, there is still a need for a shifter mechanism capable of shifting between a pair of pulleys that addresses the aforementioned drawbacks of conventional shifter mechanisms. Such a need is satisfied by the shift mechanism for a belt drive having a shift mechanism of the present invention.

BRIEF SUMMARY OF THE INVENTION

In accordance with a preferred embodiment, the present invention provides a speed select shift mechanism for a belt drive assembly that includes a shaft rotatable about an axis, a first pulley, a second pulley, and a shift collar. The first pulley is mounted on and rotatable about the shaft and includes a first aperture. The second pulley is mounted on and rotatable about the shaft and positioned adjacent the first pulley, and includes a second aperture. The shift collar is mounted on the shaft for rotation therewith and for axial movement relative to the shaft and positioned between the first and second pulleys. The shift collar is moveable between first and second positions. The shift collar includes an annular body, a first dowel and a second dowel. The first dowel extends from a first surface of the annular body and is engageable with the first aperture of the first pulley. The second dowel extends from a second surface of the annular body and is engageable with the second aperture of the second pulley. In the first position, the first dowel is engaged with the first aperture and in the second position the second dowel is engaged with the second aperture.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 11 is an enlarged partial, cross-sectional, elevation view of the shift mechanism of FIG. 10;

FIG. 12 is a side elevation view of a shaft of the shift mechanism of FIG. 10;

FIG. 19 is a perspective view of an alternative configuration of the shifter of the shift mechanism of FIG. 18; and FIG. 20 is a schematic block diagram of a control system in accordance with a preferred embodiment of the present invention.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

Figure 1:
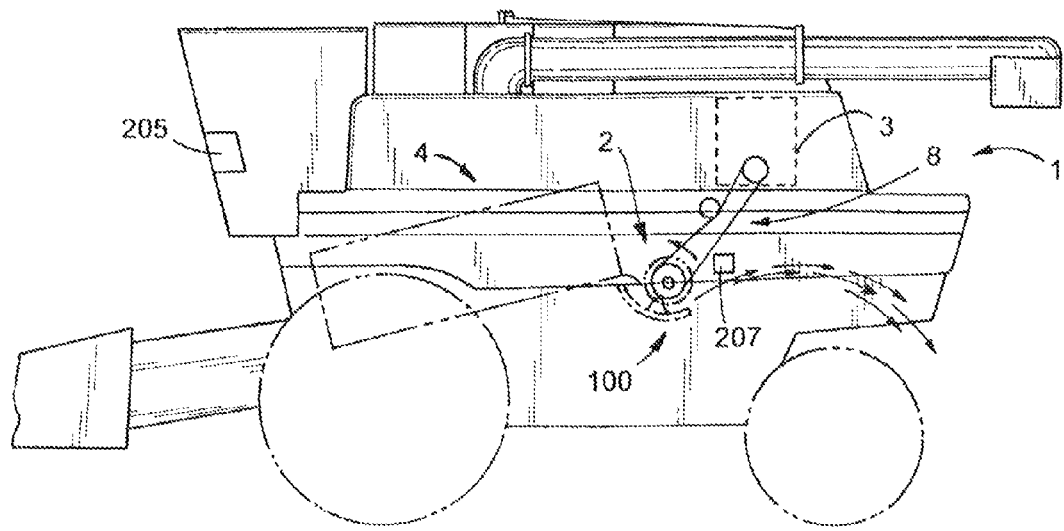
FIG. 1 is a simplified side view of an agricultural combine including a belt drive assembly according to the present invention.

Referring now to the drawings, wherein preferred embodiments of the present invention are shown, FIG. 1 illustrates a belt drive assembly 8 having a speed selection shift mechanism of the present invention as applied to an agricultural combine 1. In particular, the belt drive assembly 8 is shown to be operatively connected to a rotary straw chopper 2 (having a driven shaft) and a rotatable power source 3, such as an internal combustion engine or the like, for rotatably driving the straw chopper 2 for receiving straw and other crop residue from a threshing mechanism 4 and cutting, chopping and propelling the residue rearwardly and outwardly from the agricultural combine 1.

Referring to FIGS. 2-9, in a first preferred embodiment, the present invention provides a shift mechanism 100 of the belt drive assembly 8 for shifting between a first pulley e.g., a low speed pulley 124 and a second pulley e.g., a high speed pulley 136. The shift mechanism 100 includes a shaft 102 rotatable about an axis A, the first pulley 124, the second pulley 136, a shifter 178 mounted to the shaft 102 and a shift collar 156.

Figure 6:
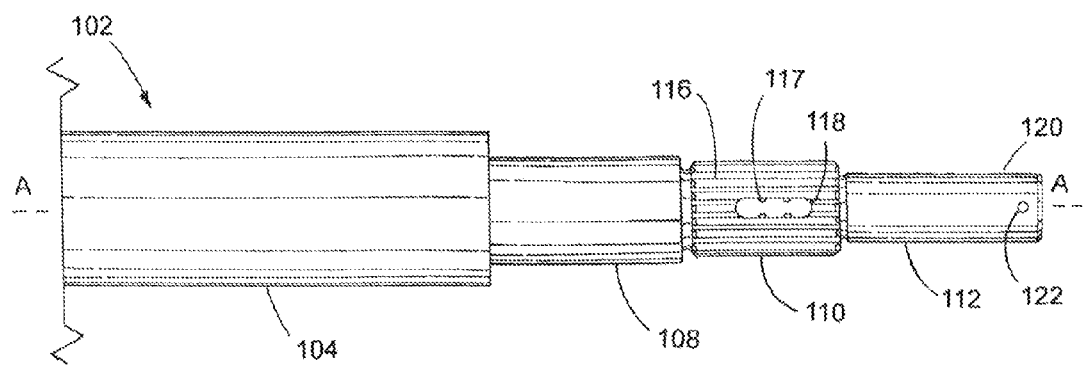
FIG. 6 is a side elevation view of a shaft of the shift mechanism of FIG. 3.

Referring to FIG. 6, the shaft 102 is preferably configured as shown and is rotatable about axis A concentric with a longitudinal axis of the shaft 102. The shaft 102 can be connected to the straw chopper 2. Alternatively, the shaft 102 can be connected to any device that has use for a rotationally driven shaft.

The shaft 102 has a proximal end that can be connected to a rotatably driven device and a distal end 120 opposite the proximal end. Progressing from the proximal end towards the distal end 120, the shaft 102 includes a first diameter section 104, a second diameter section 108 adjacent to the first diameter section 104, a third diameter section 110 adjacent to the second diameter section 108, and a fourth diameter section 112 adjacent to the third diameter section 110, each progressively smaller in diameter than the preceding section.

Figure 9:
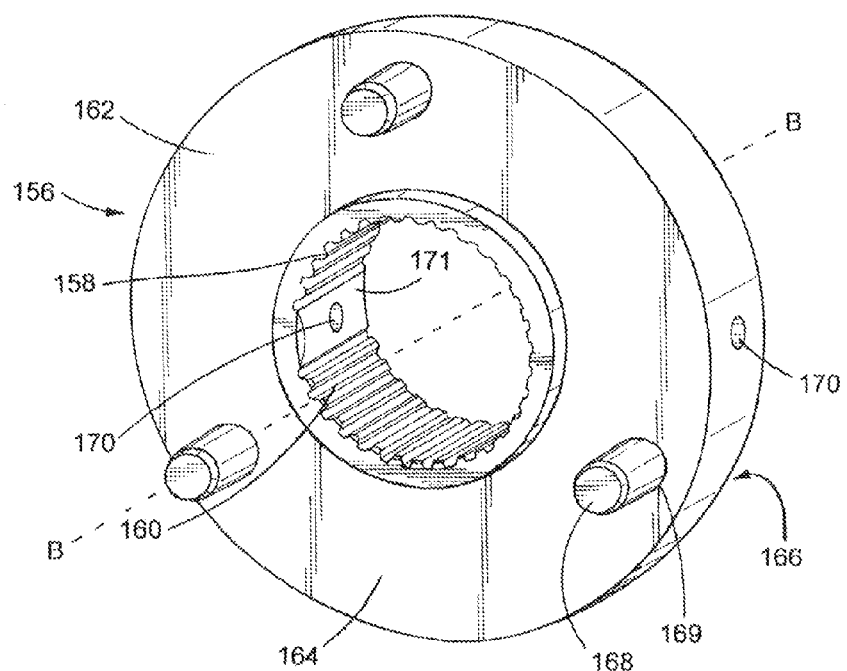
FIG. 9 is a perspective view of a shift collar of the shift mechanism of FIG. 3.

The third diameter section 110 includes splines 116 for engaging corresponding splines 160 on the shift collar 156 (FIG. 9). The third diameter section 110 further includes a through hole opening 118. The through hole opening 118 is preferably configured as an elongated slot 118 that extends completely through the shaft 102 in a direction transverse to axis A.

The second diameter section 108 is sized to receive a bearing assembly 194 situated between the second diameter section 108 and the first pulley 124. Similarly, the fourth diameter section 112 is sized to receive a bearing assembly 196 situated between the fourth diameter section 112 and the second pulley 136.

The distal end 120 of the shaft 102 includes an aperture 103 (FIG. 5) extending through the center of the shaft 102 concentric with the longitudinal axis A of the shaft 102. The aperture 103 is sized and configured to receive the shifter 178. The shifter 178 slides into the aperture 103 to operatively connect the shifter 178 to the shift collar 156, as further discussed below. The distal end 120 of the shaft 102 can optionally include through hole 122 extending transverse of the longitudinal axis of the shaft 102 for receiving a retaining pin that engages the shifter 178 to hold the shifter 178 in a fixed position.

Figure 3:
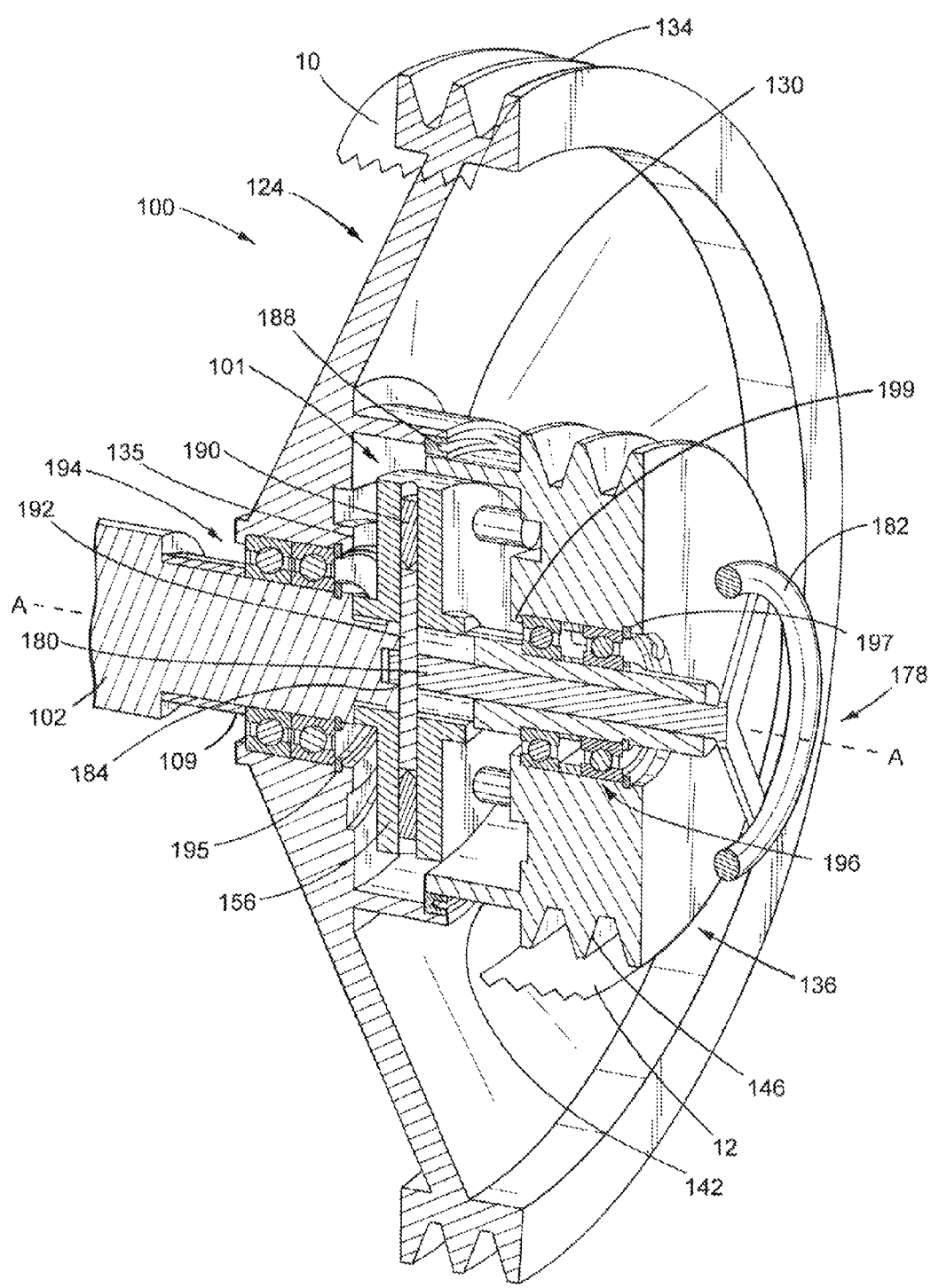
FIG. 3 is a cross-sectional perspective view of a shift mechanism of the belt drive assembly of FIG. 2 in accordance with a first preferred embodiment of the present invention.
Figure 4:
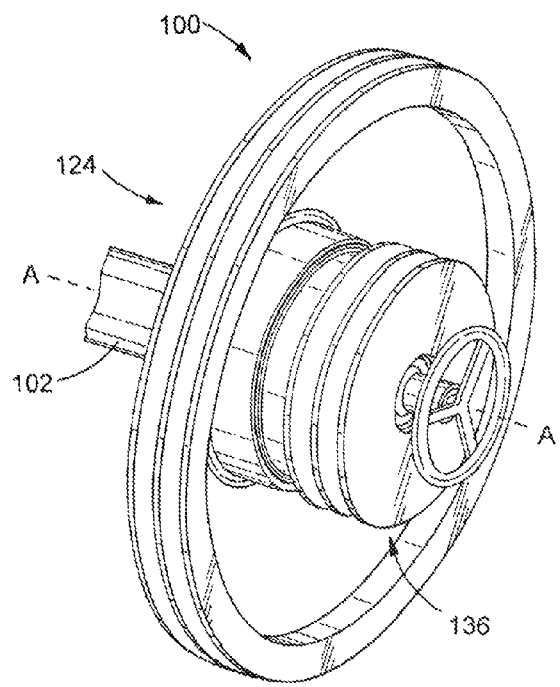
FIG. 4 is a perspective view of the shift mechanism of FIG. 3.
Figure 5:
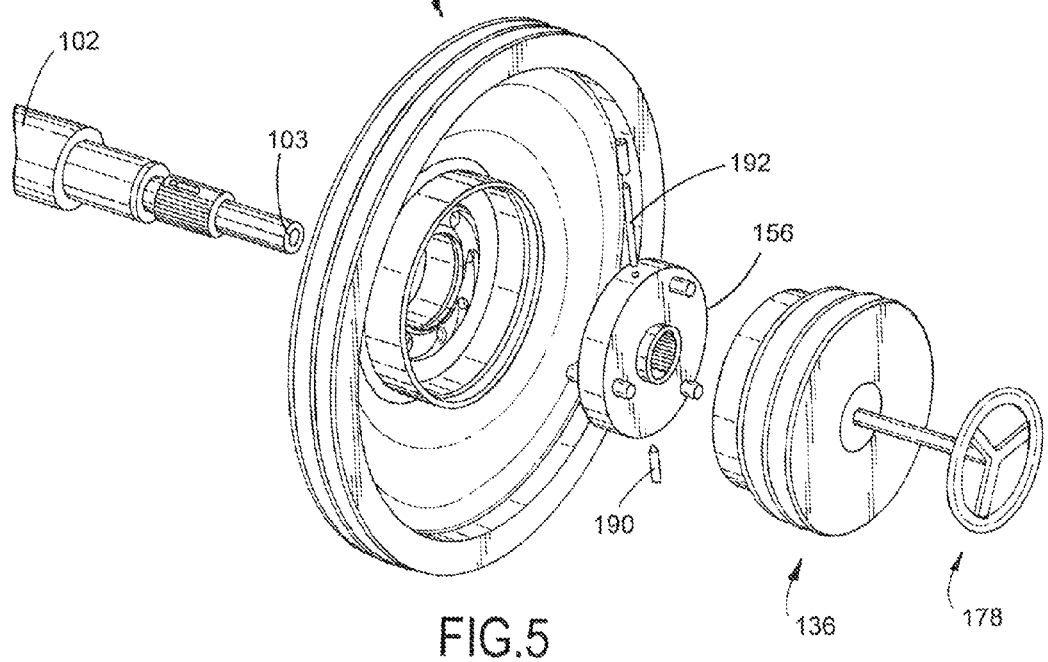
FIG. 5 is an exploded perspective view of the shift mechanism of FIG. 3.
Figure 7:
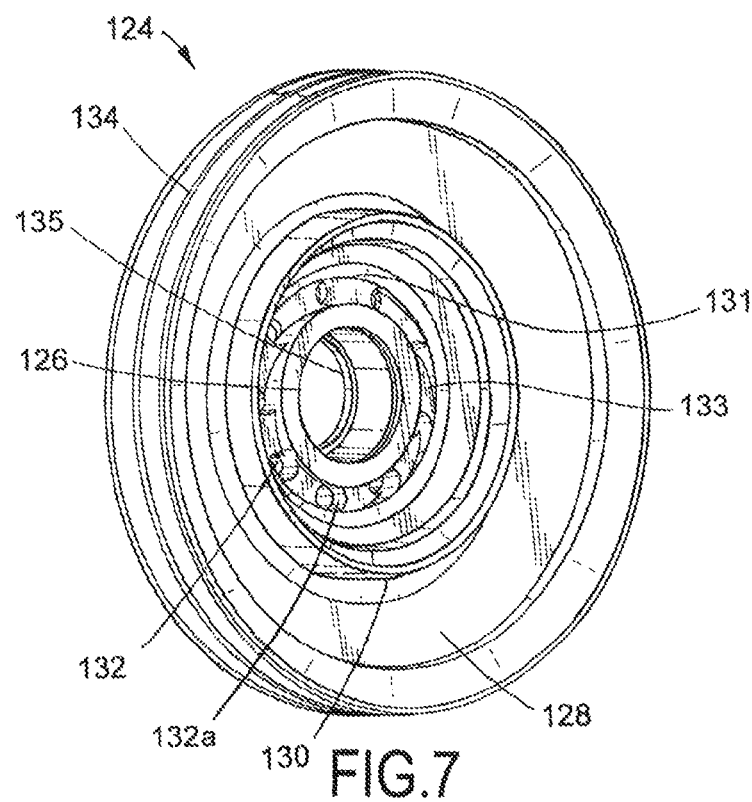
FIG. 7 is a perspective view of a first pulley of the shift mechanism of FIG. 3.

Referring to FIGS. 3, 5 and 7, the first pulley 124 is configured as best shown in FIG. 7. The first pulley 124 includes an annular body 128 having a central through hole 126 sized to mount onto the shaft's second diameter section 108 in conjunction with the bearing assembly 194. The first pulley 124 also includes a first cylindrical flange 130 (i.e. a first wall segment) having a first diameter extending from the annular body 128 or (sheave 128) towards the distal end 120 of the shaft 102 in a direction substantially parallel to the longitudinal axis A of the shaft 102 when mounted thereon. However, the first cylindrical flange 130 can alternately be configured frustoconical or frustospherical in shape or any other shape suitable for purposes of forming an enclosure.

The annular body 128 further includes at least one aperture 132 having an abutment 132a for cooperatively engaging corresponding elements 168 (FIG. 9) on the shift collar 156, as further described below. Preferably the first pulley 124 includes three apertures and more preferably nine apertures that are circumferentially and equidistantly spaced apart. The apertures 132 are positioned between the central through hole 126 and the first cylindrical flange 130. More preferably the apertures 132 are configured as counterbore apertures, as opposed to through hole apertures.

Figure 7A:
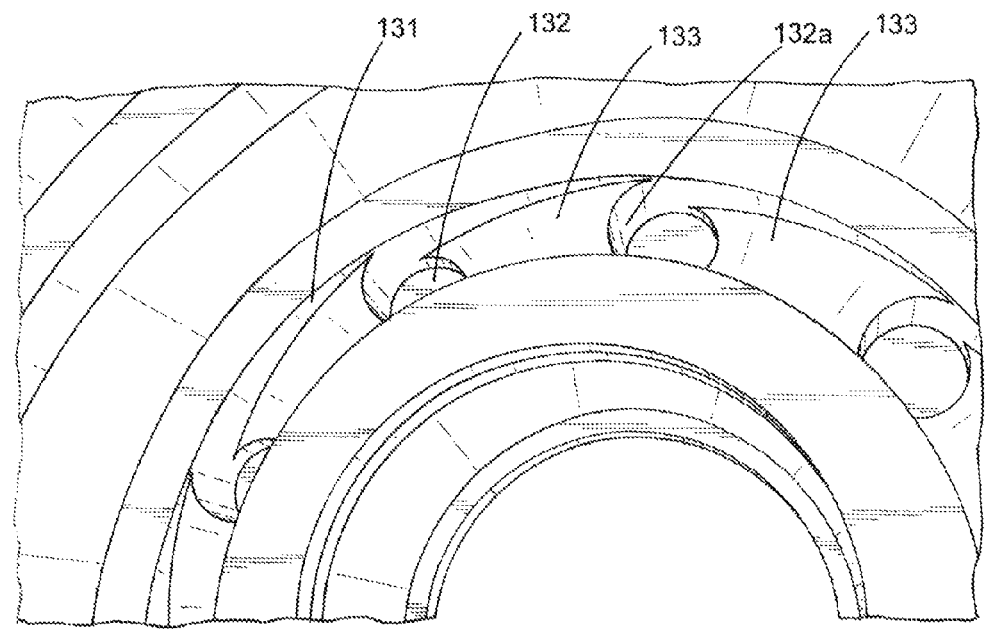
FIG. 7A is an enlarged partial perspective view of apertures of the first pulley of the shift mechanism of FIG. 3.
Figure 7B:
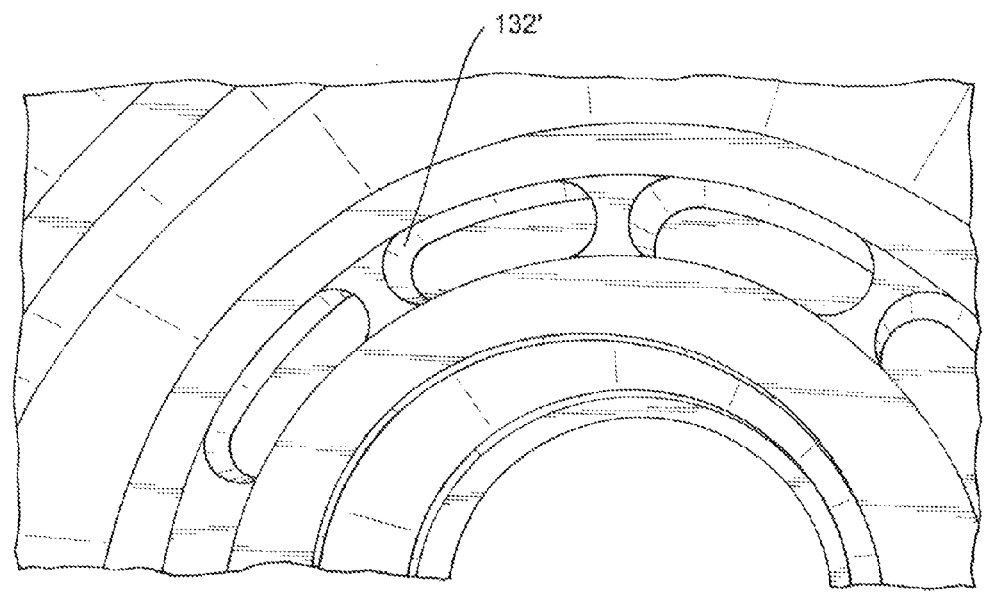
FIG. 7B is an enlarged partial perspective view of an alternative configuration of the apertures of the first pulley of the shift mechanism of FIG. 3.

The apertures 132 are positioned with an annular recess 131. The annular recess 131 is also configured to have a sloped entry 133 leading into each aperture 132 (as best shown in FIGS. 7 and 7A). While FIGS. 7 and 7A illustrate the sloped entry 133 sloping inwardly into the body of the first pulley 124 going in the counterclockwise direction, the sloped entry 133 can also be configured to slope inwardly into the body of the first pulley 124 going in the clockwise direction. Whether or not the sloped entry 133 is in the clockwise or counterclockwise direction will depend on the direction the shaft 102 is configured to rotate. Alternatively, the apertures 132 can be configured as elongated curved slots 132' (FIG. 7B), which preferably do not extend completely through the annular body 128 and which can optionally include sloped entries.

Referring back to FIG. 3, the annular body 128 of the first pulley 124 is also configured to have a conical shape so as to resemble a belleville washer, with the first cylindrical flange 130 preferably extending from an inner side of the conical shaped annular body 128.

As best shown in FIG. 3, the first pulley 124 is attached to the shaft 102 via bearing assembly 194. The first pulley 124 is configured to be in pressing engagement with the bearing assembly 194 which is also configured to be in pressing engagement with the shaft 102. The bearing assembly 194 is positioned about the second diameter section 108 of the shaft 102. The bearing assembly 194 is also retained on the shaft 102 via a snap ring 195 about a lateral end of the bearing assembly 194, a flange extension 135 of the first pulley 124 and a spacer 109 about an opposite end i.e., a medial end of the bearing assembly 194.

Figure 2:
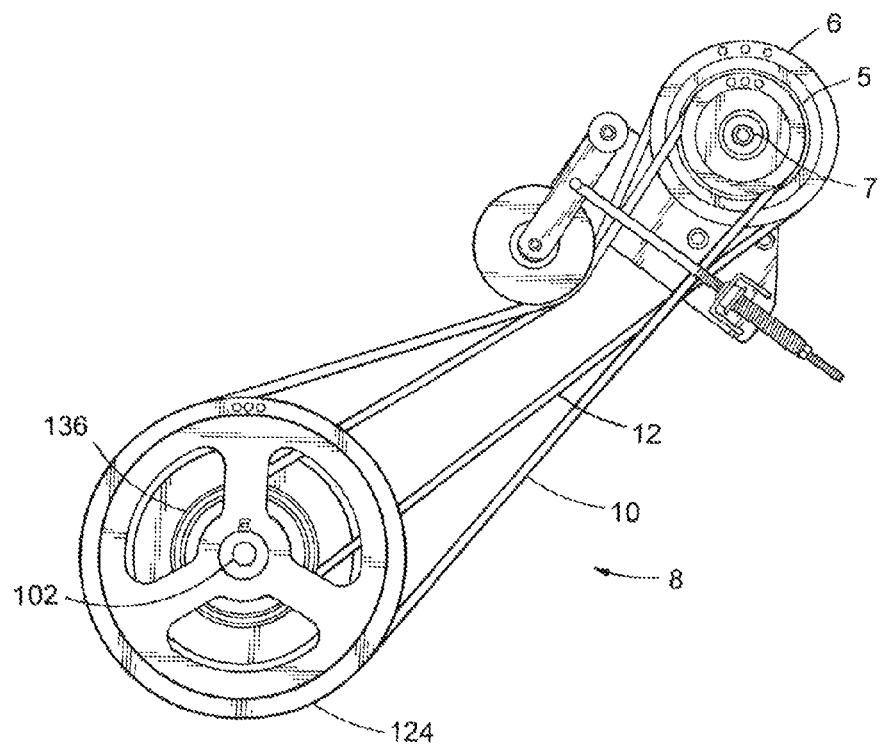
FIG. 2 is an enlarged side view of the belt drive assembly of FIG. 1.

An endless belt 10, as shown in FIGS. 2 and 3, is wrapped around the circumference of the first pulley 124 and engages with grooves 134 formed on the outer circumference of the first pulley 124. The endless belt 10 is also wrapped around and engaged with a corresponding pulley 5 attached to a drive shaft 7 of the belt drive assembly 8 to transfer power from the drive shaft 7 to the driven shaft i.e., shaft 102.

Figure 8:
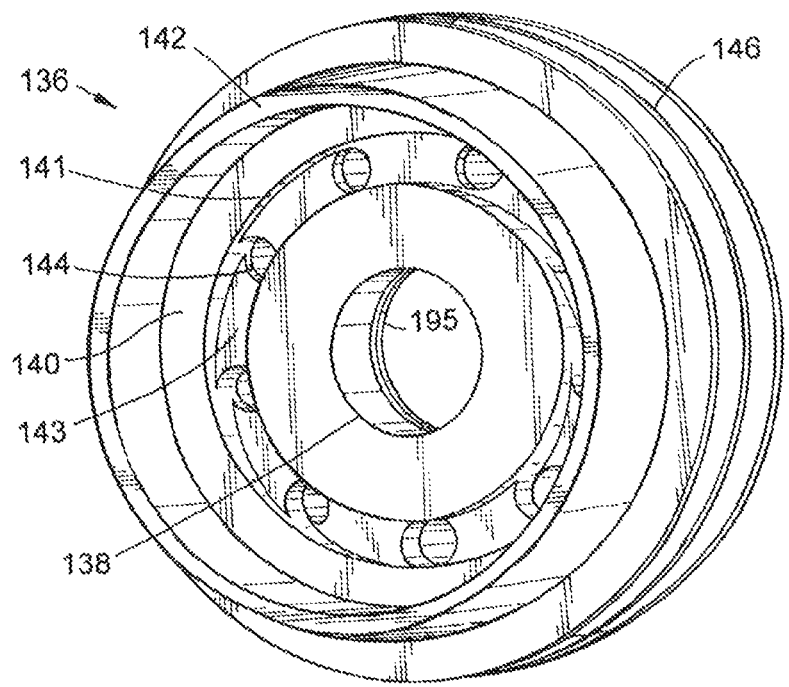
FIG. 8 is a perspective view of a second pulley of the shift mechanism of FIG. 3.

Referring to FIGS. 3, 5 and 8, the second pulley 136 is configured as best shown in FIG. 8. The second pulley 136 includes an annular body 140 having a central through hole 138 sized to mount onto the shaft's fourth diameter section 112 in conjunction with bearing assembly 196. The second pulley 136 also includes a second cylindrical flange 142 (i.e. a second wall segment) having a second diameter extending from the annular body 140 (or sheave 140) towards the proximal end of the shaft 102 in a direction substantially parallel to the longitudinal axis A of the shaft 102 when mounted thereon. However, the second cylindrical flange 142 can alternatively be configured as frustoconical or frustospherical in shape (or any other shape suitable for purposes of forming an enclosure) that correspondingly engages with the frustoconical or frustospherical extensions of the first pulley 124.

The second diameter of the second cylindrical flange 142 is configured to be slightly smaller than or larger than the first diameter of the first cylindrical flange 130 of the first pulley 124. More preferably, the first and second diameters of the first and second cylindrical flanges 130, 142 are sized to slidingly engage each other or sized such that the second cylindrical flange 142 is received within the first cylindrical flange 130 or vice versa.

The second pulley 136 also includes at least one aperture 144 having an abutment 144a for cooperatively engaging with corresponding elements 168 on the shift collar 156, as further described below. Preferably the second pulley 136 includes three apertures and more preferably nine apertures that are circumferentially and equidistantly spaced apart. The apertures 144 are positioned between the central through hole 138 of the annular body 140 and the second cylindrical flange 142. More preferably the apertures 144 are configured as counterbore apertures, as opposed to through hole apertures.

Figure 8A:
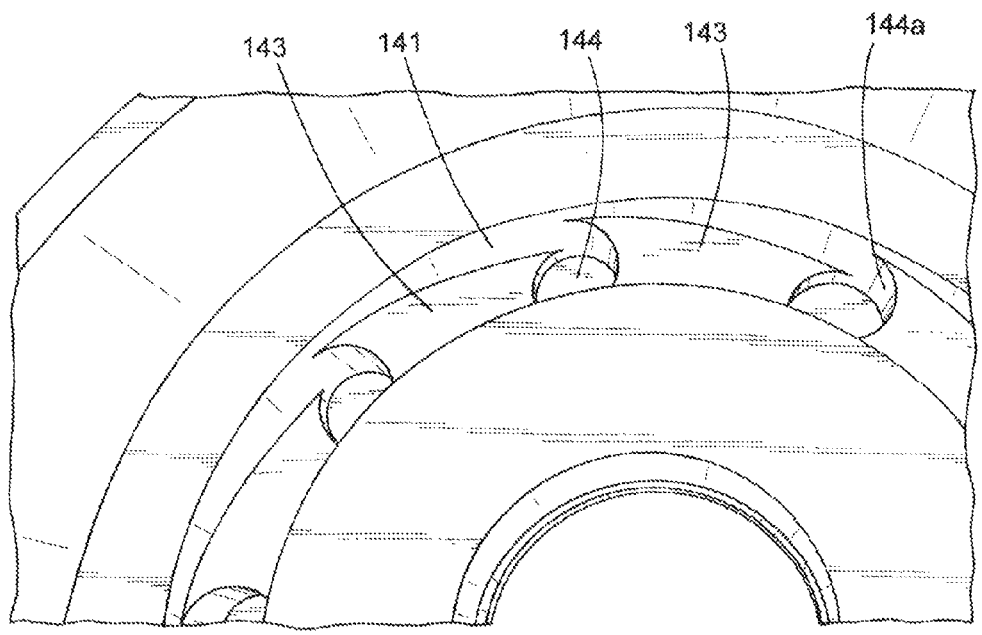
FIG. 8A is an enlarged partial perspective view of apertures of the second pulley of the shift mechanism of FIG. 3.
Figure 8B:
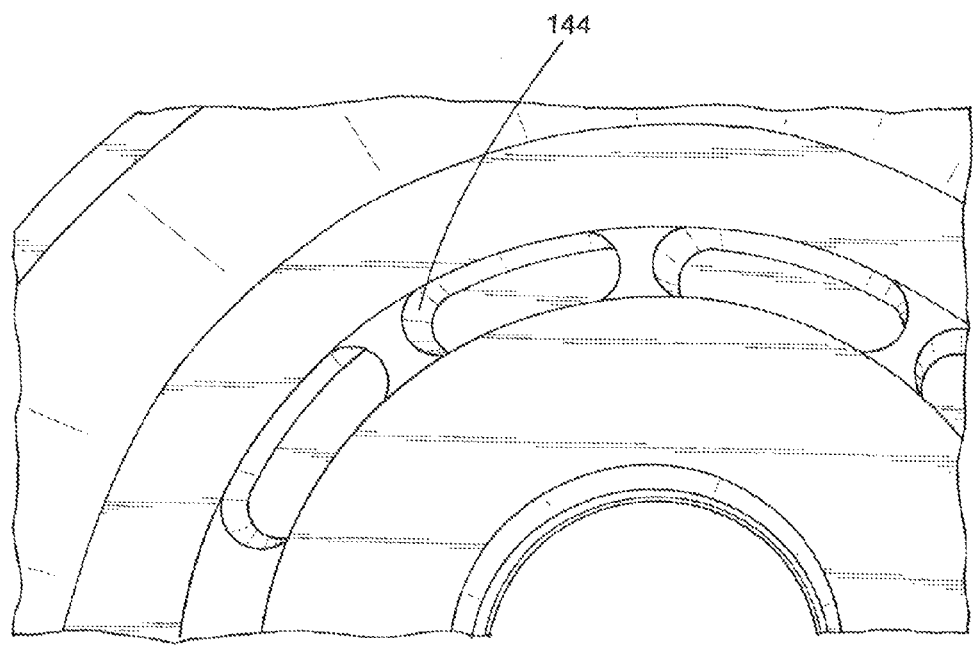
FIG. 8B is an enlarged partial perspective view of an alternative configuration of the apertures of the second pulley of the shift mechanism of FIG. 3.

The apertures 144 are positioned with an annular recess 141. The annular recess 141 is also configured to have a sloped entry 143 leading into each aperture 144 (as best shown in FIG. 8A). While FIG. 8 illustrates the sloped entry 143 sloping inwardly into the body of the second pulley 136 going in the clockwise direction, the sloped entry 143 can also be configured to slope inwardly into the body of the pulley going in the counterclockwise direction. Whether or not the sloped entry 143 is in the clockwise or counterclockwise direction will depend on the direction the shaft 102 is configured to rotate. Alternatively, the apertures 144 can be configured as elongated curved slots 144' (FIG. 8B), which preferably do not extend completely through the annular body 140 and which can optionally include sloped entries.

As best shown in FIG. 3, the second pulley 136 is attached to the shaft 102 via bearing assembly 196. The second pulley 136 is configured to be in pressing engagement with the bearing assembly 196 which is also configured to be in pressing engagement with the shaft 102. The bearing assembly 196 is positioned about the fourth diameter segment 112 of the shaft 102. The bearing assembly 196 is also retained on the shaft 102 via a snap ring 197 about a lateral end of the bearing assembly 196 and a flange extension or detent 199 of the second pulley 136 about an opposite end of the bearing assembly 196.

A second endless belt 12 (FIGS. 2 and 3) is wrapped around the circumference of the second pulley 136 and engaged with grooves 146 formed on the outer circumference of the second pulley 136. The endless belt 12 is wrapped around and engaged with a corresponding pulley 6 attached to the drive shaft 7 of the belt drive assembly 8 to transfer power from the drive shaft 7 to the shaft 102.

Referring to FIG. 9, the shift collar 156 includes an annular body 162 having a central axial hole 158 sized for operatively receiving and engaging the shaft 102. The shift collar 156 also includes internal splines 160 about the inner surface of the axial hole 158 for engaging corresponding splines 116 on the shaft 102. The shift collar 156 also includes at least one dowel 168 extending from planar side surfaces 164 (a first surface) and 166 (a second surface) (i.e. a first dowel extending from a first surface and a second dowel extending from a second surface) of the annular body 162. Preferably, the shift collar 156 includes a plurality of dowels 168 extending from surfaces 164, 166 of the annular body and more preferably three dowels 168 that are circumferentially and equidistantly spaced apart extending from each surface 164, 166. The dowels 168 are positioned radially from central axis B so as to match up in position with apertures 132, 144 on the first and second pulleys 124, 136.

The dowel 168 can be formed as a unitary structure with the annular body 162. Alternatively, the annular body 162 can be formed to have a through hole 169 sized and shaped to receive a unitary dowel 168 that is press-fitted into the through hole 169 and fixed in position. The unitary dowel 168 extends from the annular body 162 of the shift collar 156 in a direction substantially parallel to a central axis B of the shift collar 156. Thus, each end of the unitary dowel 168 forms a first dowel or dowel portion while the opposite end of the unitary dowel 168 forms a second dowel or dowel portion.

While the dowel 168 is illustrated as being a cylindrical dowel, the dowel 168 can alternatively be configured with any other shape, such as parallel piped, of oval cross-section, of triangular cross-section and the like, which are suitable for the stated purpose of engaging corresponding apertures 132, 144 within one of the first and second pulleys 124, 136. The dowel 168 can alternatively be configured to extend outwardly at an angle relative to axis B so long as the corresponding aperture on the first and second pulleys 124, 136 are correspondingly configured or angled to receive the angled dowel 168.

The shift collar 156 further includes a thru hole 170 that completely extends through the shift collar 156 in a direction perpendicular to axis B. The thru hole 170 is positioned about the shift collar 156 so as to align with the axial slot 118 on the third diameter section 110 of the shaft 102 when the shift collar 156 is mounted thereon. This alignment is aided by the addition of a flat section 171 along the curved inner surface of the shift collar 156.

Referring back to FIG. 3, the shifter 178 includes a handle 182 and an elongated shift rod 180 extending from the handle 182. The elongated shift rod 180 is sized to be slidingly received within the aperture 103 of the shaft 102. The shift rod 180 has a through hole 184 about an end opposite the end of the shift rod 180 connected to the handle 182. The through hole 184 is positioned along the shift rod 180 so as to align with the axial slot 118 of the shaft 102 and thru hole 170 of the shift collar 156 when mounted on the shaft 102. When the shift rod 180 is fully seated within the aperture 103 and its through hole 184 is aligned with the axial slot 118, a locking pin 192 (i.e., cross pin) is inserted therethrough i.e., through the thru hole 170, axial slot 118 and the through hole 184 to operatively connect the shifter 178 to the shift collar 156. Retaining pins 190 (i.e., a retaining element) can then be inserted within opposite ends of the thru hole 170 to secure the locking pin 192 in position. The retaining pins 190 can be fixed in position by threads engaging corresponding threads within thru hole 170 or be press-fitted in place.

As shown in FIG. 3, at the distal end of the shaft 102 and extending from the shaft is the handle 182 of the shifter 178. The handle 182 is used by applying pressure to the handle 182 in a pushing or pulling direction parallel to axis A of the shaft 102. The handle 182 can axially move the shifter 178 and thus move the shift collar 156 to one of three desired positions e.g. a high speed position, a low speed position or a neutral speed position.

When the first and second pulleys 124, 136 are properly mounted on the shaft 102, the first flange 130 and the second flange 142 extend towards each other a sufficient length so as to form an overlapping edge. The overlapping edges of the first and second flanges 130, 142 can be configured to receive a seal 188 that sealingly engages the first and second flanges 130, 142. The seal 188 can be an elastomeric o-ring seal, a radial seal, a chevron seal, a felt seal or the like suitable for the invention's intended use.

As shown in FIG. 3, a cavity or enclosure 101 is formed by the walls of the first pulley 124, the second pulley 136, the first and second flanges 130, 142, and first and second bearing assemblies 194, 196. The cavity 101 is an enclosure that is completely sealed from the outside environment and which encases the shift collar 156 therein. As such, the shift collar 156 advantageously operates within an environment that is completely closed off to contamination by debris, such as debris generated from harvesting operations which can adversely effect mechanical function of conventional shifter mechanisms.

Figure 10:
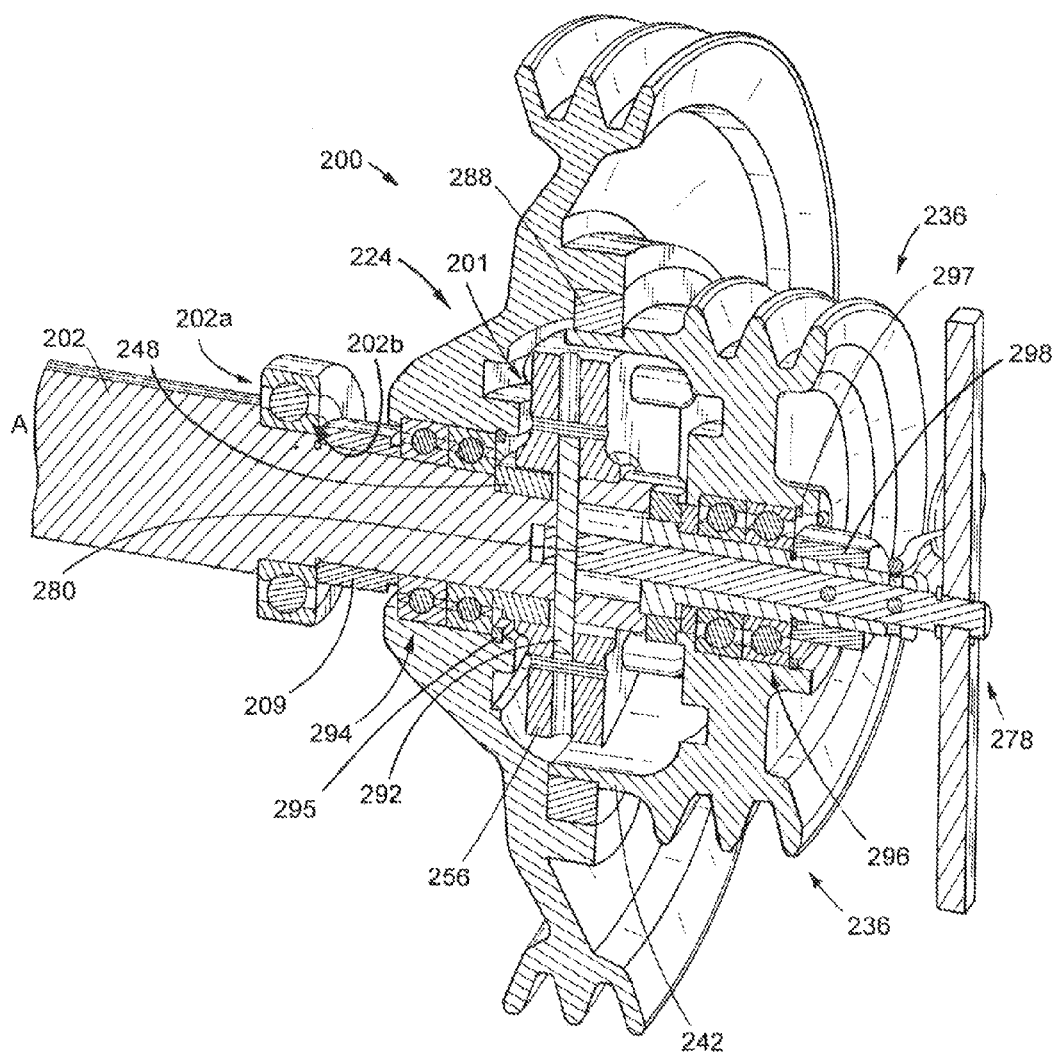
FIG. 10 is a cross-sectional perspective view of a shift mechanism in accordance with a second preferred embodiment of the present invention.

Referring to FIGS. 10-20, there is illustrated a shift mechanism 200 of the belt drive assembly 8 in accordance with a second preferred embodiment of the present invention. As shown in FIG. 10, the shift mechanism 200 includes a shaft 202, a shifter 278, a shift collar 256, a first bearing assembly 294, a second bearing assembly 296, a first pulley 224 and a second pulley 236. The shaft 202, shifter 278, shift collar 256, first pulley 224 and second pulley 236 operate substantially the same as described above for the corresponding components discussed in the first preferred embodiment, except as further described below.

Referring to FIG. 12, the shaft 202 has a proximal end that can be connected to a rotatably driven device and a distal end 220 opposite the proximal end. Progressing from the proximal end towards the distal end 220, the shaft 202 includes a first diameter section 204, a second diameter section 206 adjacent to the first diameter section 204, a third diameter section 208 adjacent to the second diameter section 206, a fourth diameter section 210 adjacent to the third diameter section 208, a fifth diameter section 212 adjacent to the fourth diameter section 210 and a sixth diameter section 214 adjacent to the fifth diameter section 212, each progressively smaller in diameter than the preceding section.

Figure 15:
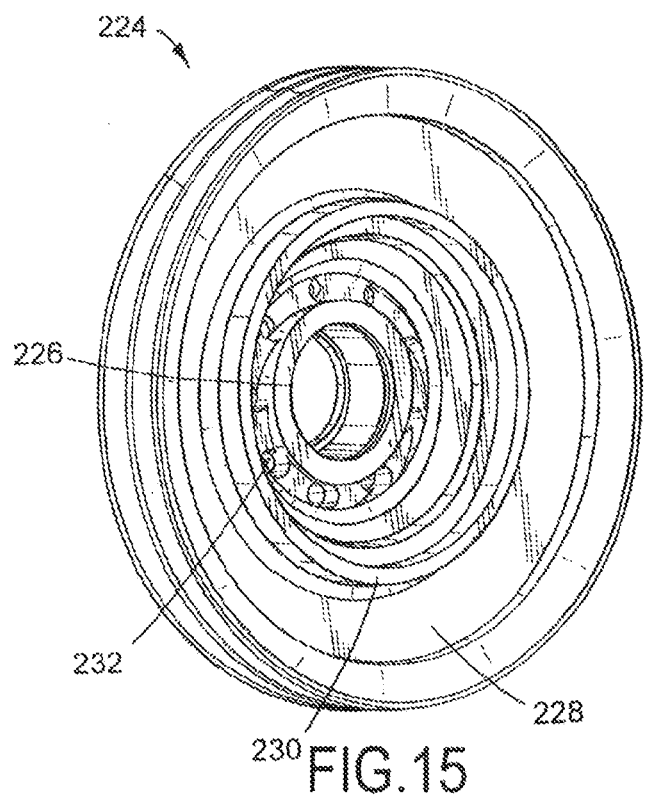
FIG. 15 is a perspective view of a first pulley of the shift mechanism of FIG. 10.

Referring to FIGS. 10 and 15, the first pulley 224 is configured as best shown in FIG. 15. The first pulley 224 includes an annular body 228 having a central through hole 226 sized to mount on the shafts third diameter section 208 in conjunction with the bearing assembly 294. The first pulley 224 also includes a first cylindrical flange 230 (i.e. a first wall segment) having a first diameter extending from the annular body 228 or (sheave 228) towards the distal end 220 of the shaft 202 in a direction substantially parallel to a longitudinal axis A of the shaft 202 when mounted thereon. However, the first cylindrical flange 230 can alternately be configured e.g., frustroconical or frustrospherical in shape. The annular body 228 further includes at least one aperture 232 substantially similar to aperture 132 of the first embodiment described above.

Figure 16:
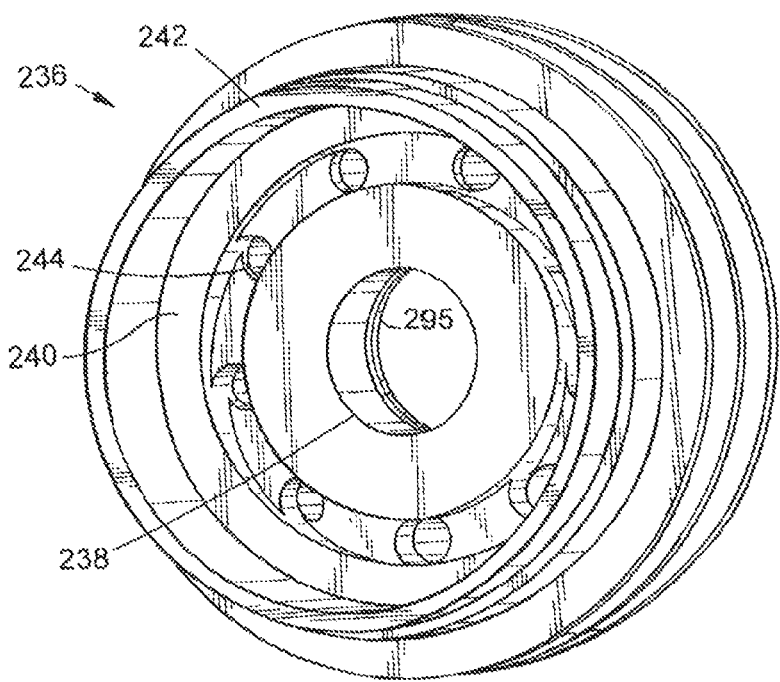
FIG. 16 is a perspective view of a second pulley of the shift mechanism of FIG. 10.

Referring to FIGS. 10 and 16, the second pulley 236 is configured as best shown in FIG. 16. The second pulley 236 includes an annular body 240 having a central through hole 238 sized to mount on the shaft's fifth diameter section 212 in conjunction with bearing assembly 296. The second pulley 236 also includes a second cylindrical flange 242 (i.e. a second wall segment) having a second diameter extending from the annular body 240 (or sheave 240) towards the proximal end of the shaft 202 in a direction substantially parallel to the longitudinal axis A of the shaft 202 when mounted thereon. However, the second cylindrical flange 242 can alternatively be configured as e.g., frustoconical or frustospherical in shape for correspondingly engaging applicable frustoconical or frustospherical extensions of the first pulley 224. The annular body 240 further includes at least one aperture 244 substantially similar to aperture 144 of the first embodiment described above.

The outside diameter of the second cylindrical flange 242 is configured to be slightly smaller than the inside diameter of the first cylindrical flange 230 of the first pulley 224. However, the outside diameter of the first cylindrical flange 230 can alternatively be configured to be smaller than the inside diameter of the second cylindrical flange 242. More preferably, the diameters of the first and second cylindrical flanges 230, 242 are sized to slidingly engage each other or sized such that the second cylindrical flange 242 is received within the first cylindrical flange 230 or vice versa. Further, the first and second cylindrical flanges 230, 242 are sized and configured to receive a seal therebetween, such as seal 288.

The shift mechanism 200 includes a shift collar spacer 248 about which the shift collar 256 mounts thereon. The shift collar 256 is located along the shaft 202 between the first pulley 224 and the second pulley 236. Located between the shift collar 256 and shaft 202 is the shift collar spacer 248. The shift collar 256 and shift collar spacer 248 are completely enclosed within a cavity 201 formed by the first and second pulleys 224, 236. A seal 288 is located between first and second flanges 230, 242 of the first and second pulleys 224, 236. The seal 288 can be configured as an elastomeric o-ring seal, a radial seal, a chevron seal, a felt seal or the like suitable for the invention's intended use.

Figure 17:
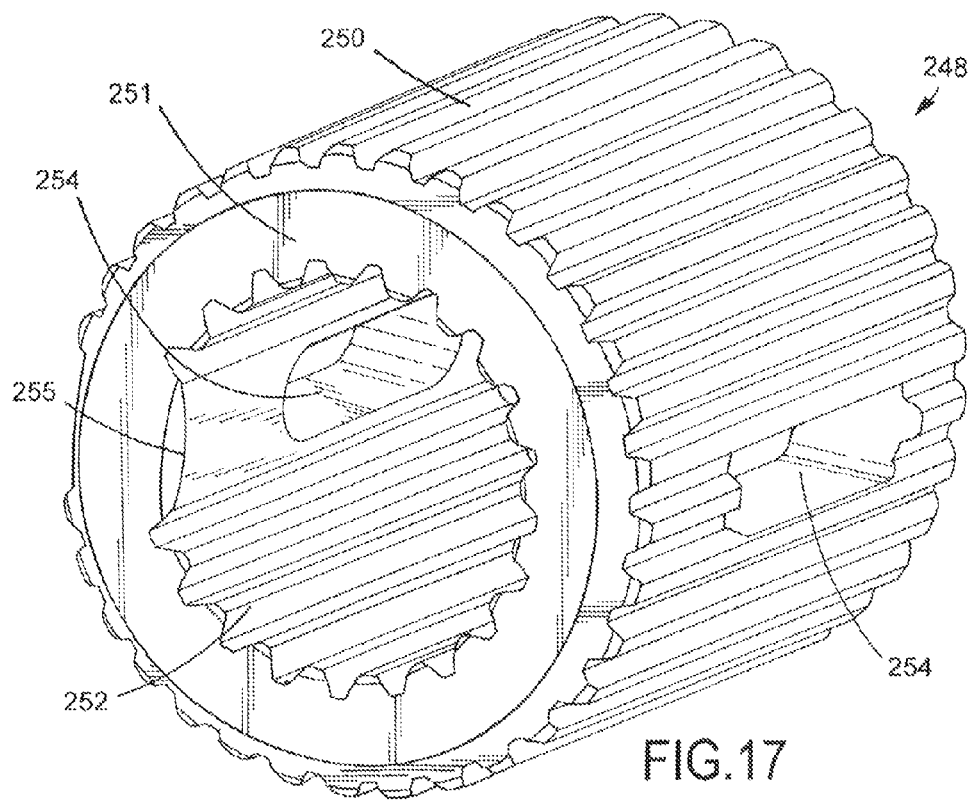
FIG. 17 is a perspective view of the shift collar spacer of the shift mechanism of FIG. 10.

The shift collar spacer 248 is configured as best shown in FIG. 17. The shift collar spacer 248 has a substantially tubular body 251 with internal splines 252 and external splines 250 formed thereon. The internal splines 252 are configured to operatively engage corresponding splines 216 on the shaft 202. The external splines 250 are configured to operatively engage corresponding splines 260 on the shift collar 256. The shift collar spacer 248 also includes an axial slot 254 that extends through the cylindrical body 251 in a direction transverse to a central longitudinal axis of the shift collar spacer 248. The shift collar spacer 248 is also configured and positioned between the first and second bearing assemblies 294, 296, as shown in FIG. 10

Referring to FIG. 10, the shift mechanism 200 further includes a locking nut 298 located about the distal end 220 of the shaft 202 for locking the assembly of the shift mechanism 200 in a fixed position on the shaft 202. The shift collar spacer 248 in conjunction with the locking nut 298 clamps the bearing assemblies 294, 296 to the distal end of the shaft 202. A spacer 209 is also placed on the shaft 202 and situated about the third diameter section 208 of the shift 202 to facilitate locking of the overall assembly on the shaft 202.

The first pulley 224 is positioned on the shaft 202 about the third diameter section 208. Additionally, the first bearing assembly 294 is positioned on the third diameter section 208 and in pressing engagement with the shaft 202. Spacer 209 and snap ring 296 facilitate locking the first bearing assembly 294 in position.

The second pulley 236 is positioned on the shaft 202 about the fifth diameter section 212. Additionally, the second bearing assembly 296 is positioned on the fifth diameter section 212 and in pressing engagement with the shaft 202. Shift collar spacer 248 and snap ring 297 facilitate locking the second bearing assembly 296 in position.

As shown in FIG. 17, the shift collar spacer 248 is a substantially tubular member having an axial through hole for receiving the shaft 202 and internal splines 252 for mating with corresponding splines 216 on the shaft 202. The mating splines 216, 252 transfer power (i.e., rotational forces) from the shift collar spacer 248 to the shaft 202. External splines 250 of the shift collar spacer 248 are configured to engage with corresponding splines 260 on the shift collar 256 which thereby transfer power from the shift collar 256 to the shift collar spacer 248.

Figure 13:
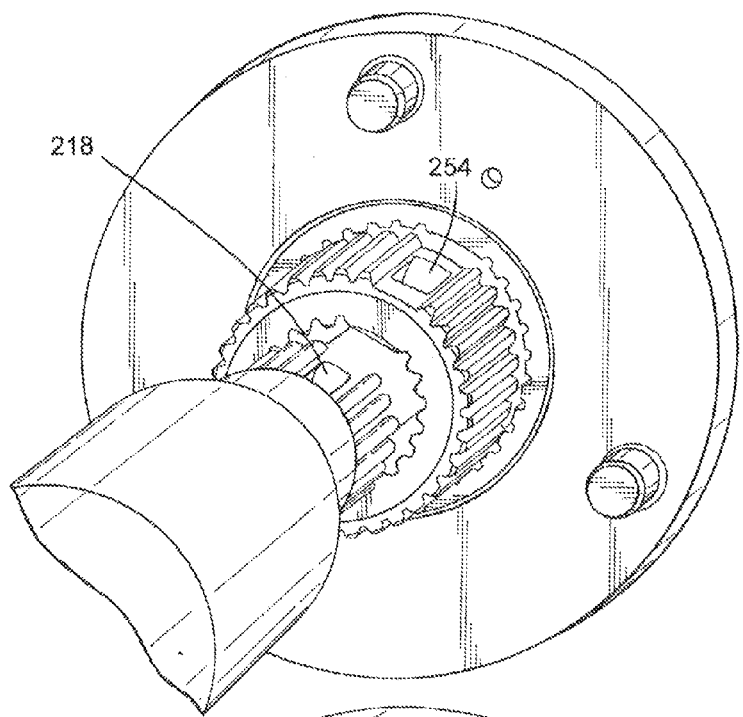
FIG. 13 is a partial perspective view of the shaft, the shift collar and the shift collar spacer of the shift mechanism of FIG. 10.
Figure 14:
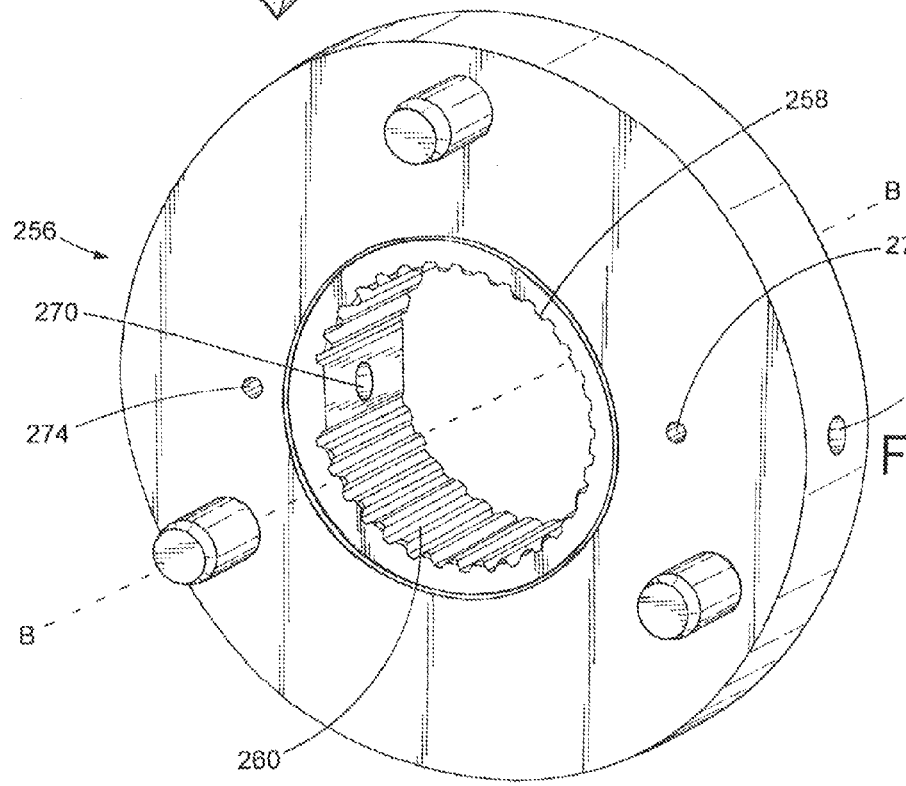
FIG. 14 is a perspective view of the shift collar of the shift mechanism of FIG. 10.

Further, the shift collar spacer 248 includes a planar chord-like segment 255 that extends the length of the shift collar spacer 248 and about which the axial slot 254 extends through. As shown in FIGS. 11 and 13, the axial slot 218 of the shaft 202 and the axial slots 254 of the shift collar spacer 248 are aligned so as to be concentric with or overlapping with each other.

Operatively, the shift collar spacer 248 is positioned along the fourth diameter section 210 of the shaft 202. The shift collar spacer 248 is held in position between the first pulley bearing assembly 294 and the second pulley bearing assembly 296. The shift collar 256 slidingly engages the shift collar spacer 248 to move in an axial direction along the length of the shift collar spacer 248.

Figure 18:
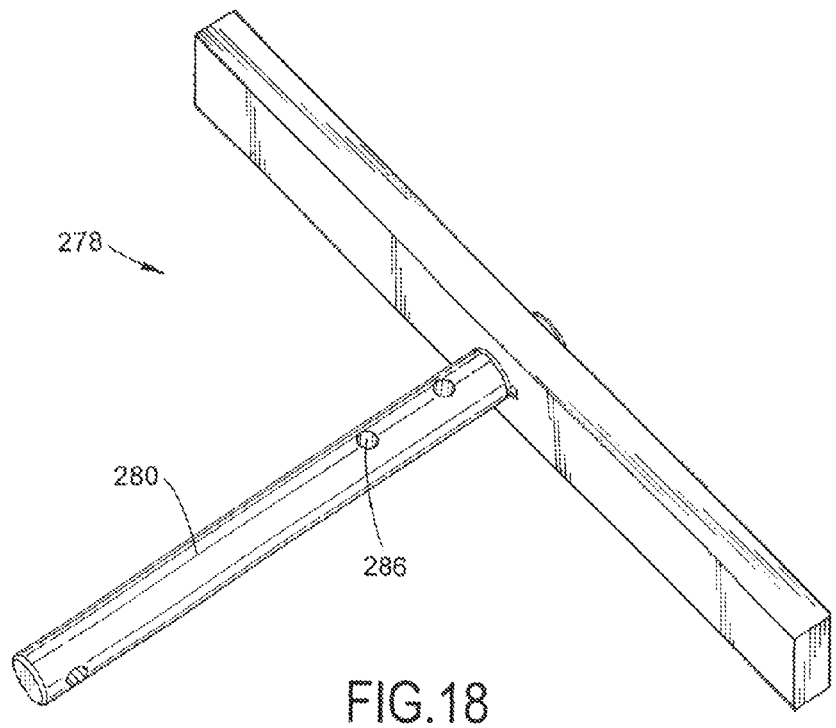
FIG. 18 is a perspective view of a shifter of the shift mechanism of FIG. 10.

Referring to FIG. 18, the shifter 278 can be locked into place along a length of the shaft 202 (i.e., at a first, second or third position) with a cotter pin 299 (FIG. 11) placed through one of a plurality of holes 286 on the distal end of the shifter rod 280 and a mating locking hole 222 on the distal end of the shaft 202 to maintain the shifter 278 in a fixed position during use of the device. As the cotter pin 299 has an opposite end that is fixed to the shaft 202, its use eliminates unwanted movement by the shift collar 256 during use and the need for any detents to releasably hold the shift collar 256 in place, such as detents 117, as discussed in the first preferred embodiment. Alternatively, the cotter pin 299 can be replaced with a shifter detent or any other locking mechanism suitable for the invention's intended use.

Referring back to FIGS. 11 and 14, the shift collar 256 is configured the same as shift collar 156 except for locking holes 274 and the size of the hole 258, which is configured to receive and mate with the shift collar spacer 248. The shift collar 256 includes locking holes 274, (i.e., thru holes) and corresponding pins 276 that slidingly engage the locking holes 274. The locking holes 274 run perpendicular to thru holes 270. Similar to locking pin 192 as discussed in the first embodiment, a locking pin 292 connects the shift collar 256 to the shifter 278. That is, the locking pin 292 engages the shift collar 256, the shift collar spacer 248 and the shifter 278, as shown in FIG. 11. The locking pin 292 is held in place by pins 276 that prohibit the ends of the locking pin 292 from exiting through the thru holes 270.

Alternatively, the shifter 278 can be a shift fork or operatively connected to an actuator 207 (FIG. 19), such as a hydraulic or electric actuator for moving the shifter rod 280 between first and second positions. Thus, for example, as shown in FIG. 20 the actuator/shifter assembly allows for control of the shifter via a controller 205 from a remote location, such as the cab of the combine or a wireless handheld device operated by a user outside of the combine to allow the user to make simple and efficient changes in belt speed between high speed, low speed and neutral positions depending on the requirements of the rotatably driven device.

The operation of the shift mechanism 100 is now described with reference to the first preferred embodiment. However, the foregoing operational description of the shift mechanism 100 is equally applicable to the shift mechanism 200.

In operation, the shift mechanism 100 is used to transfer power from a driver shaft 7 to the shaft 102. The driver shaft 7 has two pulleys 5, 6, each of which is in connection with corresponding pulleys 124, 136 on the shaft 102 via endless belts 10, 12. The endless belts 10, 12 are in tension while wrapped around and engaged with the pulleys.

As the pulleys on the driver shaft 7 rotate, the endless belts 10, 12 rotate in corresponding fashion. The rotating endless belts 10, 12 cause the corresponding first and second pulleys 124, 136 on the shaft 102 to rotate without any power being transferred to the shaft 102 as the pulleys 124, 136 rotate freely about the shaft on the bearing assemblies 194, 196. Power is transferred from either of the first and second pulleys 124, 136 to the shaft 102 only when the shift collar 156 operatively engages one of the first and second pulleys 124, 136.

The shift collar 156 is configured to move between first, second and third positions along the axial length of the shift collar's third diameter section 110. The shift collar 156 is moved between positions by the shifter 178, which is connected to the shift collar 156 via locking pin 192 that extends through the shifter's through hole 184. Thus, the shift collar 156 is moved between first, second and third positions by moving the shifter 178 in an axial direction, either towards the right or left, as shown in FIG. 3 to engage or disengage from the first or second pulleys 124, 136.

In the first position (e.g., a low speed position, as illustrated in FIG. 3), the shift collar 156 is adjacent to and engaged with the first pulley 124. That is, when the shift collar 156 engages the first pulley 124, the plurality of dowels 168 are received within the apertures 132 of the first pulley 124 to operatively transfer rotational forces from the first pulley 124 to the shift collar 156, which then transfers rotational forces to the shaft 102 owing to the engaging splines 160 and 116 on the shift collar 156 and shaft 102, respectively.

In the second position (e.g., a high speed position), the shift collar 156 is engaged with the second pulley 136 and disengaged from the first pulley 124. That is, when the shift collar 156 engages the second pulley 136, the plurality of dowels 168 are received within the apertures 144 of the second pulley 136 to operatively transfer rotational forces from the second pulley 136 to the shift collar 156, which then transfers rotational forces to the shaft 102 owing to the engaging splines 160 and 116 on the shift collar 156 and shaft 102, respectively.

In the third position (i.e., a neutral position), the shift collar 156 is neither engaged with the first pulley 124 nor the second pulley 136. That is, the dowels 168 of the shift collar 156 are not operatively engaged with either of the first or second pulleys 124, 136. As such, the shift collar 156 is free from rotational forces acting upon it and the first and second pulleys 124, 136 are free to rotate about the shaft 102 without the shaft 102 rotating. The shift collar 156 is maintained in the respective first, second and third positions by appropriate detents 117 or friction features. As shown in FIG. 6, two sets of detents 117 are located within the elongated slot 118 of the shaft 102 for releasably holding the shift collar 156 in one of three positions. In an alternative configuration, three sets of detents 117 can be configured and positioned within the elongated slot 118 of the shaft 102 for releasably holding the shift collar 156 in one of three positions. While such detent mechanisms are preferred, alternative detent mechanisms suitable for the present invention can be used, such as the detent mechanism disclosed in U.S. Pat. No. 6,773,367, the entire disclosure of which is hereby incorporated by reference herein in its entirety.

The instant invention advantageously provides a number of benefits over the prior art. For example, the shift collar 156 includes dowels 168 which allow for simplicity in design (i.e., easier to machine with less tolerance issues) and easier mechanical operations for engaging and disengaging from first and second pulleys 124, 136. Further, the instant invention provides for a shift collar 156 that operatively moves within a sealed environment (i.e., a sealed enclosure) which drastically reduces the adverse impact of debris on the mechanical operations of the shift mechanism.

It will be appreciated by those skilled in the art that changes could be made to the embodiments described above without departing from the broad inventive concept thereof. For example, alternative components and methods of cooperatively engaging the pulleys to the shift collar can be used. It is to be understood, therefore, that this invention is not limited to the particular embodiments disclosed, but it is intended to cover modifications within the spirit and scope of the present invention as defined by the appended claims.

We claim:

1. A shift mechanism for a belt drive assembly comprising:
   a shaft rotatable about an axis;
   a first pulley mounted on and rotatable about the shaft, the first pulley including a first counter-bore aperture;
   a second pulley mounted on and rotatable about the shaft and positioned adjacent the first pulley, the second pulley including a second counter-bore aperture; and
   a shift collar mounted on the shaft for rotation therewith and for axial movement relative to the shaft, and positioned between the first and second pulleys, wherein the shift collar is moveable between first and second positions, the shift collar including:
   an annular body,
   a first dowel extending from a first surface of the annular body engageable with the first counter-bore aperture of the first pulley, and
   a second dowel extending from a second surface of the annular body engageable with the second counter-bore aperture of the second pulley,
   wherein in the first position the first dowel is engaged with the first counter-bore aperture and in the second position the second dowel is engaged with the second counter-bore, aperture, and
   wherein the shift collar is completely enclosed within an enclosure formed by the first and second pulleys, the enclosure sealed from an outside environment.

2. The shift mechanism of claim 1, wherein the shift collar is moveable to a third position, wherein in the third position the first and second dowels are disengaged from the first and second counter-bore apertures.

3. The shift mechanism of claim 2, further comprising a shifter operatively engaged with the shift collar for moving the shift collar between first and second positions.

4. The shift mechanism of claim 1, wherein the shift collar includes three dowels and the first and second pulleys each include three counter-bore apertures.

5. The shift mechanism of claim 1, wherein the first and second apertures are each an elongated curved slot.

6. The shift mechanism of claim 1, wherein the shaft includes splines and the shift collar includes cooperating splines for mating thereto.

7. The shift mechanism of claim 1, further comprising a spacer mounted between the shift collar and shaft that operatively engages the shift collar and the shaft.

8. The shift mechanism of claim 1, wherein the shift collar further comprises a through hole and a cross pin positionable within the through hole.

9. The shift mechanism of claim 8, wherein the through hole extends substantially perpendicular to the axis of the shaft.

10. The shift mechanism of claim 9, wherein the shift collar further includes a retaining element securing the cross pin in position.

11. The shift mechanism of claim 8, wherein the cross pin is received within a shifter extending axially through the shaft.

12. The shift mechanism of claim 8, wherein the shaft includes a through hole for receiving the cross pin.

13. The shift mechanism of claim 1, wherein the enclosure is a substantially hermetically sealed enclosure.

14. The shift mechanism of claim 1, wherein the enclosure is formed by wall segments extending from the first and second pulley and wherein the first and second wall segments are sealed by a seal.

15. The shift mechanism of claim 1, wherein the enclosure is formed by a first flange extending from the first pulley and a second flange extending from the second pulley and overlapping with the first flange.

16. The shift mechanism of claim 1, further comprising detents for releasably securing the shift collar in the first and second positions.

17. The shift mechanism of claim 1, further comprising a shifter operatively engaged with the shift collar for moving the shift collar between first and second positions.

18. The shift mechanism of claim 17, wherein the shifter extends axially through the shaft.

19. The shift mechanism of claim 17, wherein the shifter includes an actuator operatively connected to a controller.

20. The shift mechanism of claim 1, in combination with an agricultural harvester wherein the harvester comprises the belt drive assembly and the shift mechanism forms a portion of the belt drive assembly.

* * * * *